United States Patent
Nakagaki et al.

(10) Patent No.: US 9,722,260 B2
(45) Date of Patent: Aug. 1, 2017

(54) FUEL CELL ION EXCHANGER AND FUEL CELL SYSTEM

(71) Applicant: TOYOTA BOSHOKU KABUSHIKI KAISHA, Aichi-ken (JP)

(72) Inventors: Nobuhiko Nakagaki, Toyoake (JP); Junko Ohira, Kariya (JP); Yuki Matsuda, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 17 days.

(21) Appl. No.: 14/950,705

(22) Filed: Nov. 24, 2015

(65) Prior Publication Data

US 2016/0164118 A1 Jun. 9, 2016

(30) Foreign Application Priority Data

Dec. 5, 2014 (JP) ................. 2014-247233

(51) Int. Cl.
*H01M 8/04* (2016.01)
*H01M 8/04044* (2016.01)
*H01M 8/04029* (2016.01)
*B01J 47/024* (2017.01)

(52) U.S. Cl.
CPC ....... *H01M 8/04044* (2013.01); *B01J 47/024* (2013.01); *H01M 8/04029* (2013.01)

(58) Field of Classification Search
CPC ..... C02F 1/42; B01J 47/024; H01M 8/04044; H01M 8/04029
See application file for complete search history.

(56) References Cited

U.S. PATENT DOCUMENTS

2013/0199980 A1* 8/2013 Miller .................... B01J 47/024
210/182

FOREIGN PATENT DOCUMENTS

JP 2013-233499 11/2013

* cited by examiner

*Primary Examiner* — Stewart Fraser
*Assistant Examiner* — Monique Wills
(74) *Attorney, Agent, or Firm* — Greenblum & Bernstein, P.L.C.

(57) ABSTRACT

An ion exchanger includes a lower casing, an upper casing, and a cartridge. The lower casing includes an upper opening and a circumferential wall, which includes an intake port and a discharge port. The upper casing includes a lid, which is arranged on the opening of the lower casing, and a cylinder, which extends downward from the lid and is accommodated in the circumferential wall. The cartridge, which is provided integrally with the inner side of the cylinder, accommodates an ion exchange resin. The cylinder includes a communication hole, through which the inner side of the cylinder is in communication with the intake port. The upper casing includes an accumulation limiting structure that limits the air remaining immediately below the lower surface of the lid in the upper casing after flowing into the cylinder together with coolant.

8 Claims, 5 Drawing Sheets

FUEL CELL ION EXCHANGER AND FUEL CELL SYSTEM

TECHNICAL FIELD

The present invention relates to an ion exchanger arranged in a coolant circuit of a fuel cell and a fuel cell system including the ion exchanger.

BACKGROUND ART

A fuel cell system includes a coolant circuit through which coolant flows to cool a fuel cell. The coolant circuit includes an ion exchanger that removes metal ions from the coolant by adsorbing the metal ions on an ion exchange resin (refer to, for example, Japanese Laid-Open Patent Publication No. 2013-233499).

The ion exchanger of the above patent document includes a case. The case includes an intake port, which draws coolant into the case, and a discharge port, which discharges coolant out of the case. A lid is arranged on an upper open end of the case. A cartridge, which is fixed to the lid, accommodates an ion exchange resin. A cylinder, which is accommodated in the case, is formed integrally with the lower surface of the lid. The cartridge is fixed to the inner circumferential surface of the cylinder in a removable manner. The cylinder includes a communication hole through which the inner side of the cylinder is in communication with an upper one of the intake port and the discharge port.

In the ion exchanger of the above patent document, when coolant is drawn through the intake port and into the case, the ion exchange resin adsorbs metal ions from the coolant as the coolant flows through the cartridge. The coolant from which the ions have been removed is discharged out of the case through the communication hole and the upper port.

In the ion exchanger of the above patent document, the cartridge is fixed to the lid. Thus, the lid and the cartridge are removed from the case simultaneously. Accordingly, when exchanging the cartridge, the intake port and a connection port do not have to be removed from a pipe of the coolant circuit. This facilitates the exchanging of cartridges.

However, the ion exchanger of the above patent document has a shortcoming in which the cylinder includes a void above the communication hole. Thus, air, which enters the cylinder together with the coolant, is apt to remain in the void, that is, immediately below the lower surface of the lid. The residual air is suddenly discharged from the ion exchanger to a coolant pipe. As a result, a large amount of air will flow into a pump arranged in the coolant circuit. This may cause a discharge failure of the pump such as cavitation. Further, when a large amount of air flows into the fuel cell, the fuel cell is cooled unevenly.

SUMMARY OF THE INVENTION

It is an object of the present invention to provide a fuel cell ion exchanger and a fuel cell system that restricts sudden discharge of a large amount of air into a coolant pipe of the fuel cell.

A fuel cell ion exchanger to achieve the above object is arranged in a coolant circuit for a fuel cell. The ion exchanger includes a lower casing, an upper casing, and a cartridge. The lower casing includes an upper opening, an intake port, and a discharge port. The discharge port is located in an upper portion of a circumferential wall. The upper casing includes a lid and a cylinder. The lid is arranged on the opening. The cylinder extends downward from the lid and is accommodated at an inner side of the circumferential wall. The cartridge is provided integrally with an inner side of the cylinder. The cartridge accommodates an ion exchange resin. The cylinder includes a communication hole, through which the inner side of the cylinder is in communication with the discharge port. The upper casing includes an accumulation limiting structure that limits air remaining immediately below a lower surface of the lid after entering the cylinder together with coolant.

Since such a structure limits the air remaining immediately below the lower surface of the lid in the upper casing, air in the cylinder is smoothly discharged out of the ion exchanger.

EMBODIMENTS OF THE INVENTION

One embodiment will now be described with reference to FIGS. 1 to 6. A fuel cell system of the present embodiment is installed in a vehicle.

Figure 1:
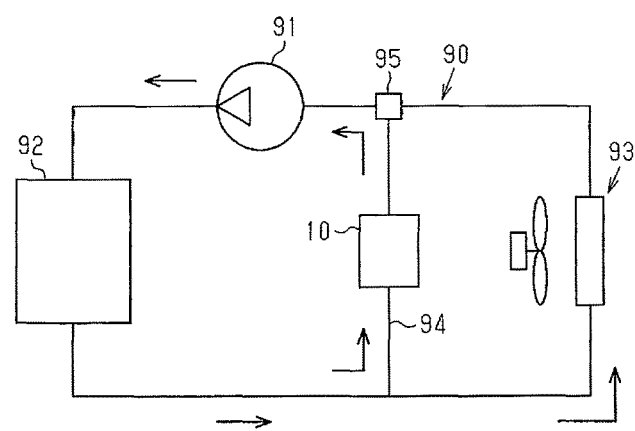
FIG. 1 is a schematic diagram showing a coolant circuit in one embodiment of a fuel cell system.

As shown in FIG. 1, the fuel cell system is provided with a coolant circuit 90 that includes a pump 91, which draws in and discharges coolant, a fuel cell 92, and a heat exchanger 93, which exchanges heat with ambient air to cool the coolant. The coolant circuit 90 includes a bypass 94, which bypasses the heat exchanger 93. An ion exchanger 10, which adsorbs and removes ions from the coolant, is arranged in the bypass 94. A three-way valve 95 is arranged at a downstream end of the bypass 94.

Figure 2:
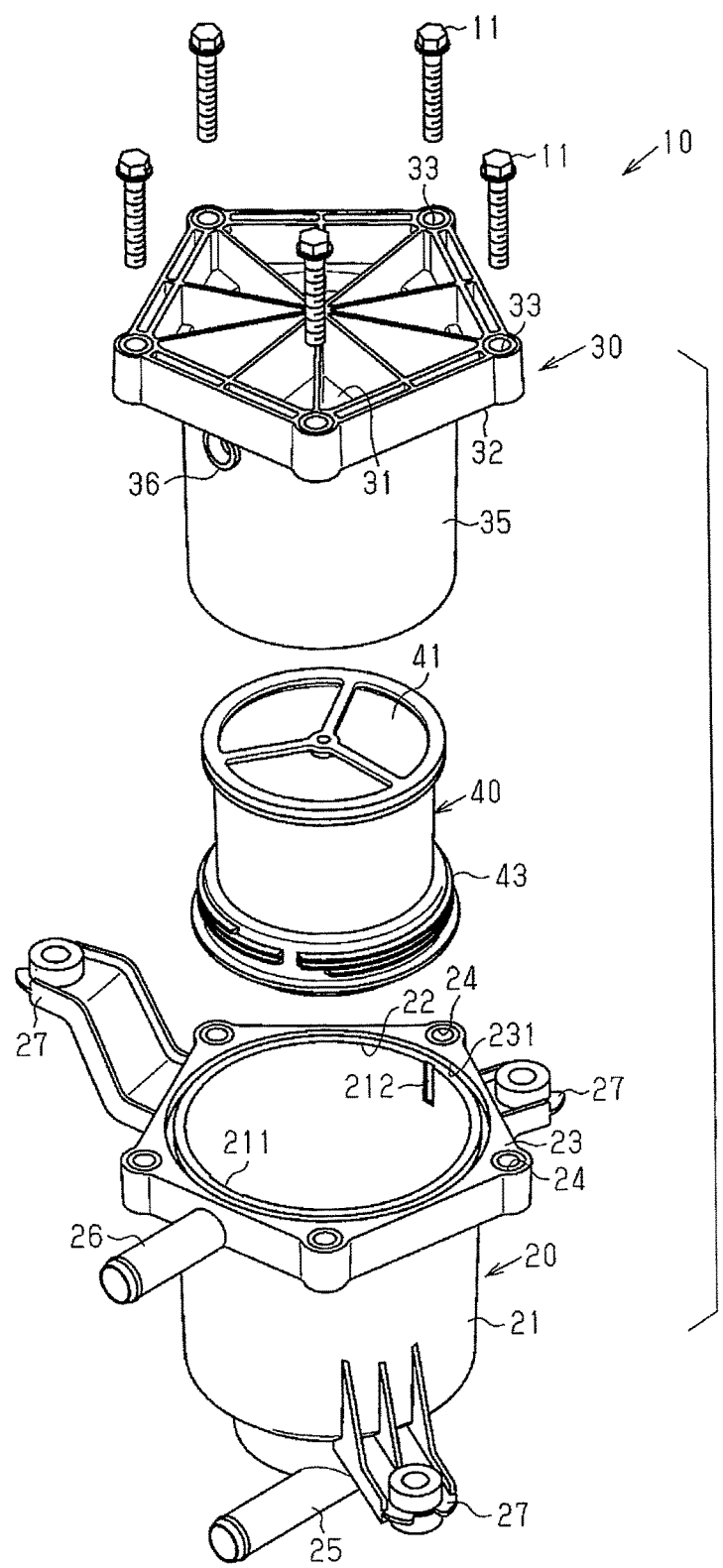
FIG. 2 is an exploded perspective view of the fuel cell system shown in FIG. 1.
Figure 6:
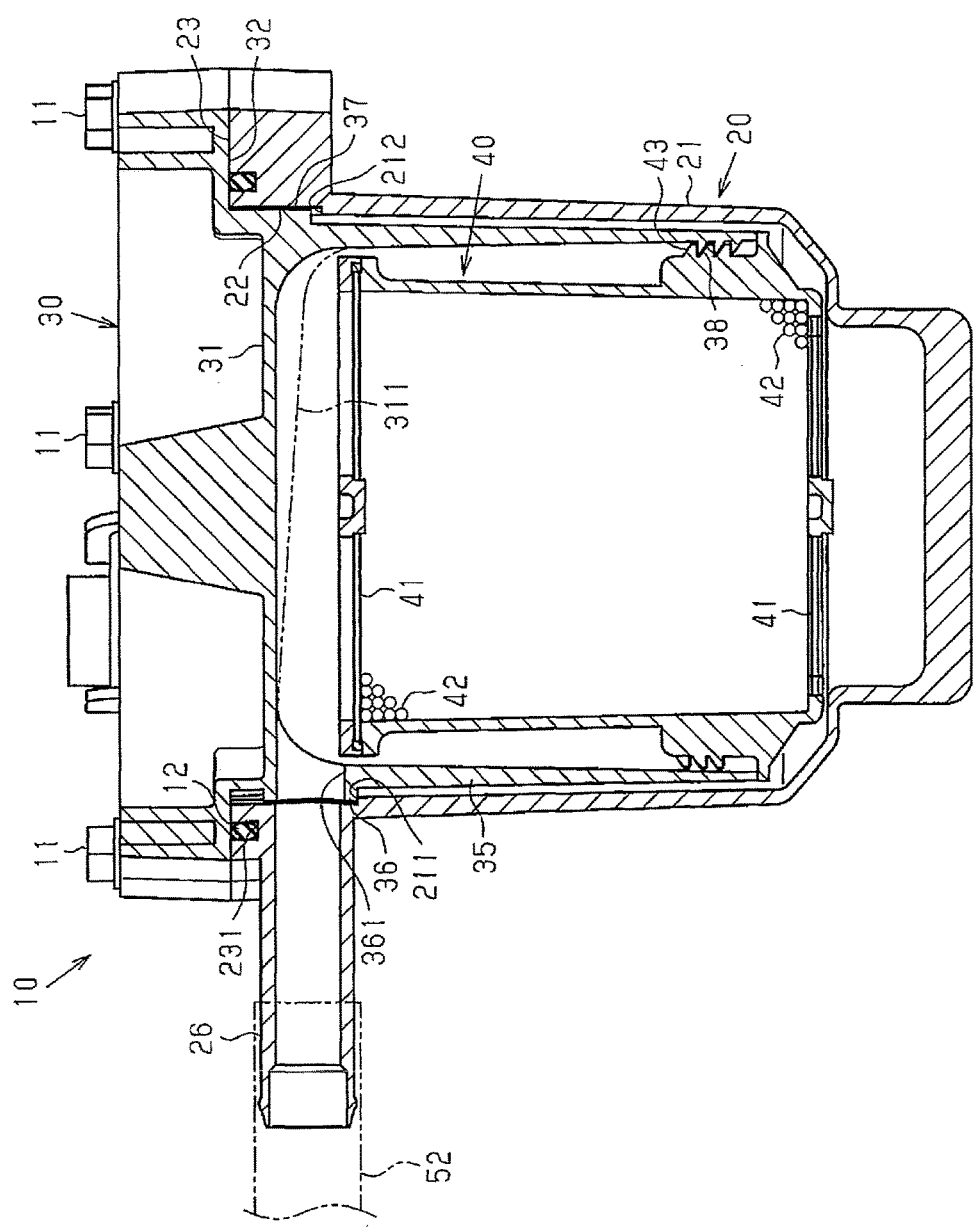
FIG. 6 is a vertical cross-sectional view of the ion exchanger shown in FIG. 2.

As shown in FIGS. 2 and 6, the ion exchanger 10 includes a lower casing 20, an upper casing 30, and a cartridge 40. The upper portion of the lower casing 20 includes an opening 22. The lower portion of the lower casing 20 includes a bottom wall. The upper casing 30 includes a lid 31, which is arranged on the opening 22, and a cylinder 35, which extends downward from the lid 31. The cartridge 40, which is provided integrally with the inner side of the cylinder 35, accommodates an ion exchange resin 42. The lower casing 20, the upper casing 30, and the cartridge 40 are formed from a hard resin material.

Figure 3:
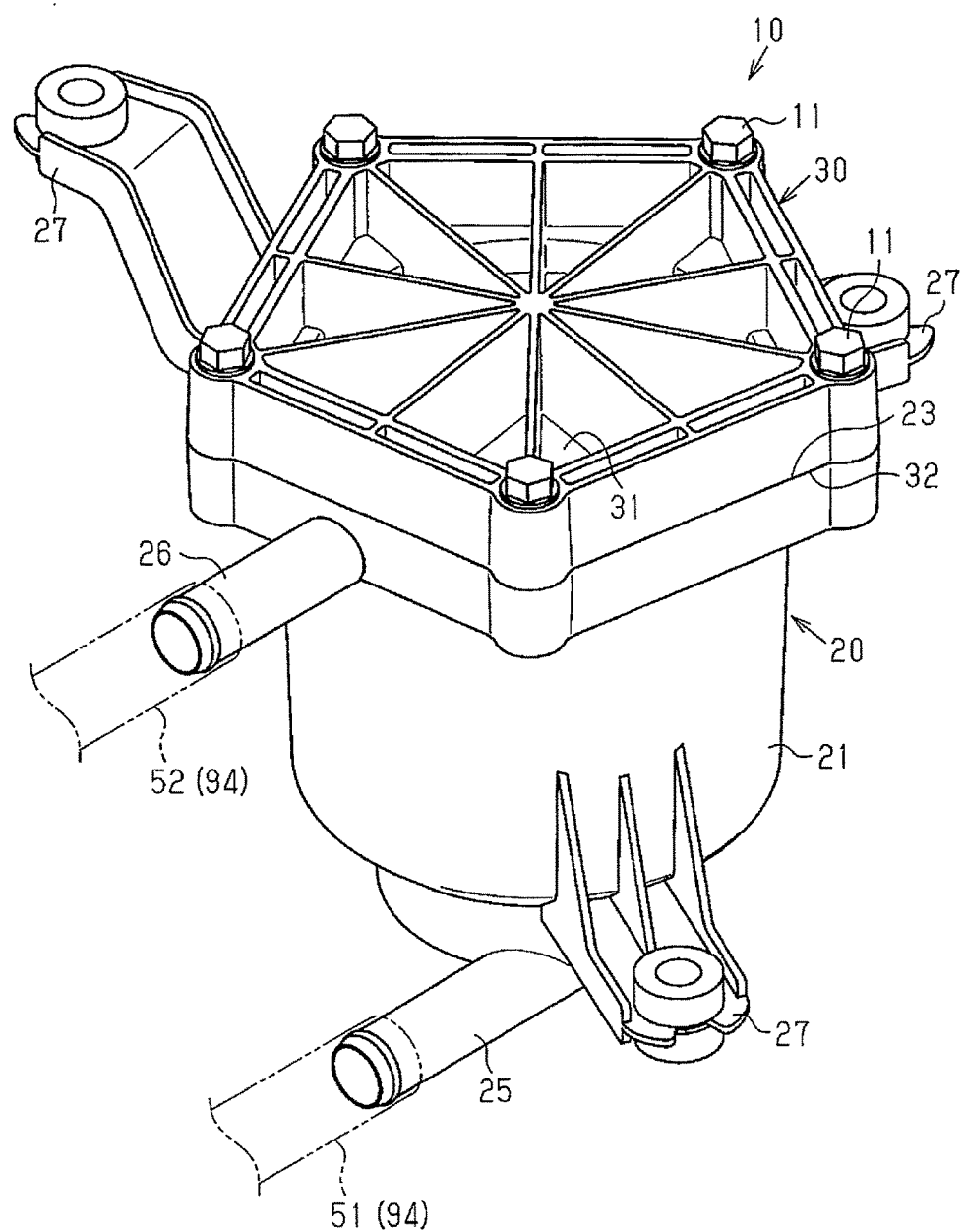
FIG. 3 is a perspective view of an ion exchanger shown in FIG. 2.

As shown in FIGS. 2 and 3, the lower casing 20 includes a tubular circumferential wall 21. A tubular intake port 25 and a tubular discharge port 26 project from the lower portion and the upper portion of the circumferential wall 21, respectively.

As shown by the broken line in FIG. 3, an upstream pipe 51, which is located at the upstream side of the ion exchanger 10 in the bypass 94, is connected to the intake port 25. A downstream pipe 52, which is located at the downstream side of the ion exchanger 10 in the bypass 94, is connected to the discharge port 26.

Figure 4:
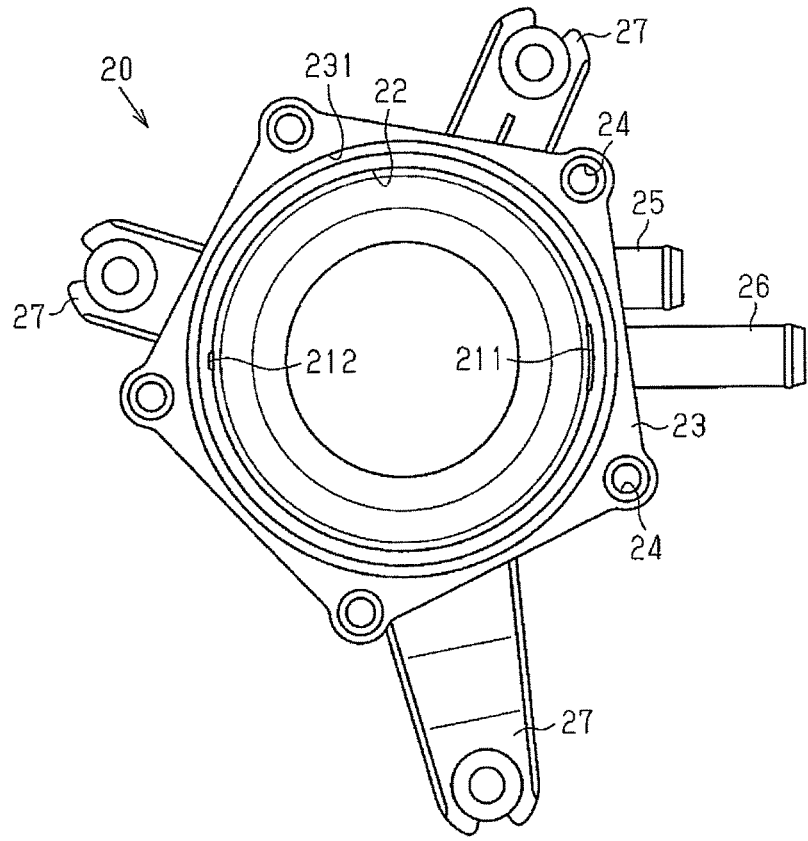
FIG. 4 is an upper view of a lower casing of the ion exchanger shown in FIG. 2.

As shown in FIGS. 2, 3, and 6, a flange 23 is formed at the upper end of the circumferential wall 21. As shown in FIGS. 2 and 4, the upper surface of the flange 23 includes an annular groove 231, which receives a gasket 12 (refer to FIG. 6). Further, the flange 23 includes threaded holes 24 at the outer side of the annular groove 231 located at regular intervals in the circumferential direction.

As shown in FIGS. 2, 3, and 4, brackets 27, which fix the lower casing 20 to a vehicle with bolts, are formed integrally with the circumferential wall 21.

As shown in FIGS. 2, 4, and 6, the inner edge at the upper end of the circumferential wall 21 includes a first recess 211 and a second recess 212 that are opposed to each other. The first recess 211 is located at the same position as the discharge port 26 in the circumferential direction.

Figure 5:
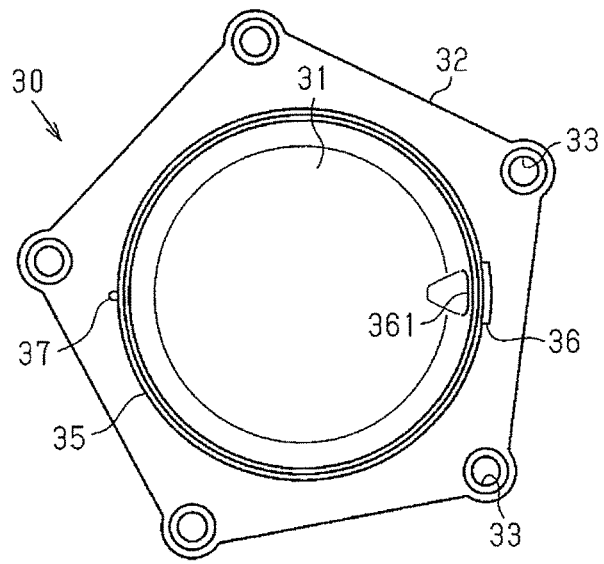
FIG. 5 is a lower view of an upper casing of the ion exchanger shown in FIG. 2.

As shown in FIGS. 2, 3, 5, and 6, a flange 32 is formed on the outer edge of the upper end of the lid 31. As shown in FIGS. 2 and 5, the flange 32 includes bolt holes 33 located at regular intervals in the circumferential direction.

As shown in FIGS. 5 and 6, the upper portion of the cylinder 35 includes a communication hole 361. The outer circumferential surface of the cylinder 35 includes a tube 36, which projects from the rim of the communication hole 361 toward the outer side. A projection 37 is formed on the outer circumferential surface of the cylinder 35 at the opposite side of the tube 36.

As shown in FIG. 6, the tube 36 and the projection 37 of the upper casing 30 are fitted into the first recess 211 and the second recess 212 of the lower casing 20, respectively. The upper end of the wall surface of the communication hole 361 is located at the same height as the lower surface of the lid 31 of the upper casing 30. That is, the upper end of the wall surface of the communication hole 361 is flush with the lower surface of the lid 31. Further, the inner diameter of the communication hole 361 and the inner diameter of the discharge port 26 are the same, and the communication hole 361 and the discharge port 26 are coaxial. Thus, when the cylinder 35 is accommodated in the circumferential wall 21 of the lower casing 20, the inner space of the cylinder 35 is in communication with the discharge port 26 through the communication hole 361.

As shown in FIG. 6, the inner circumferential surface of the cylinder 35 includes an internal thread 38.

As shown in FIGS. 2 and 6, the cartridge 40 has the form of a tube. A mesh 41 is arranged in each of upper and lower openings of the cartridge 40. The mesh 41 restricts the passage of the ion exchange resin 42 from the cartridge 40 and allows the passage of coolant and air.

As shown in FIG. 6, the outer circumferential surface of the cartridge 40 includes an external thread 43. When the cartridge 40 is inserted from below into the cylinder 35 of the upper casing 30, the external thread 43 of the cartridge 40 is engaged with the internal thread 38 of the upper casing 30 to fasten the cartridge 40 to the upper casing 30 in a removable manner.

When assembling the ion exchanger 10, the cartridge 40 is first coupled to the cylinder 35 of the upper casing 30. Then, the cylinder 35 of the upper casing 30 is inserted from above into the circumferential wall 21 of the lower casing 20 so that the upper surface of the flange 23 of the lower casing 20 comes into contact with the lower surface of the flange 32 of the upper casing 30. Subsequently, as shown in FIG. 2, bolts 11 are inserted through the bolt holes 33 of the upper casing 30 and fastened to the threaded holes 24 of the lower casing 20. This couples the lower casing 20 to the upper casing 30 as shown in FIG. 3.

The operation of the present embodiment will now be described.

In the ion exchanger 10, when coolant is drawn into the lower casing 20 through the intake port 25, the ion exchange resin 42 adsorbs metal ions from the coolant that passes through the cartridge 40. The coolant from which the ions have been removed is discharged out of the lower casing 20 through the communication hole 361 and the discharge port 26.

In the present embodiment, there is no void above the communication hole 361 in the cylinder 35. Thus, when air flows into the cylinder 35 together with coolant, the upper casing 30 limits the air that remains immediately below the lower surface of the lid 31. This smoothly discharges the air in the cylinder 35 out of the ion exchanger 10 through the communication hole 361 and the discharge port 26. Accordingly, the sudden discharge of a large amount of air to the downstream pipe 52 is restricted.

The fuel cell ion exchanger and the fuel cell system have the following advantages.

(1) The cylinder 35 of the upper casing 30 includes the communication hole 361, through which the inner space of the cylinder 35 is in communication with the discharge port 26. The upper casing 30 includes an accumulation limiting structure that limits the air remaining immediately below the lower surface of the lid 31 in the upper casing 30 after flowing into the cylinder 35 together with coolant.

Since such a structure limits the air remaining immediately below the lower surface of the lid 31 in the upper casing 30, air in the cylinder 35 is smoothly discharged out of the ion exchanger 10. Thus, a sudden discharge of a large amount of air to the downstream pipe 52 is restricted. This reduces discharge failures of the pump 91 such as cavitation that would occur when a large amount of air flows into the pump 91 of the coolant circuit 90. This also limits situations in which the fuel cell 92 is cooled unevenly when a large amount of air flows to the fuel cell 92.

(2) Since the upper end of the wall surface of the communication hole 361 is located at the same height as the lower surface of the lid 31 of the upper casing 30, there is no void above the communication hole 361 in the cylinder 35. This limits the air remaining immediately below the lower surface of the lid 31.

(3) The tube 36, which includes the communication hole 361, projects from the outer circumferential surface of the cylinder 35 of the upper casing 30. The first recess 211, which receives the tube 36, is formed in the inner surface of the circumferential wall 21 of the lower casing 20.

In such a structure, the tube 36 of the upper casing 30 is fitted into the first recess 211 of the lower casing 20 to connect the communication hole 361 and the discharge port 26. Thus, there is no gap between the communication hole 361 and the discharge port 26. This limits air leaking from between the communication hole 361 and the discharge port 26 and allows the air in the upper casing 30 to be discharged out of the ion exchanger 10.

(4) The tube 36 and the projection 37 of the upper casing 30 are fitted into the first recess 211 and the second recess 212 of the lower casing 20, respectively. This allows for simple and accurate positioning of the upper casing 30 in the circumferential direction relative to the lower casing 20.

It should be apparent to those skilled in the art that the present invention may be embodied in many other specific forms without departing from the spirit or scope of the invention. Particularly, it should be understood that the present invention may be embodied in the following forms.

The projection 37 and the second recess 212 may be omitted.

The tube 36 may be omitted, and the communication hole 361 may be changed to a hole that extends through the cylinder 35. In this case, the first recess 211 may be omitted.

As shown by the broken line in FIG. 6, the lower surface 311 of the lid 31 may be located at the same height as the upper end of the wall surface of the communication hole 361 at a portion adjacent to the communication hole 361. Further, the lower surface 311 may become lower as the distance from the communication hole 361 increases, that is, toward the right as viewed in FIG. 6. In this case, air flows through the intake port 25 into the upper casing 30 and moves upward in the cylinder 35. When the air reaches the lower surface 311 of the lid 31, the air smoothly moves toward the communication hole 361 while guided by the lower surface 311 of the lid 31, which becomes higher as the distance from the communication hole 361 decreases. Then, the air is discharged from the discharge port 26 to the downstream pipe 52 through the communication hole 361. Accordingly, the air remaining immediately below the lower surface 311 of the lid 31 in the upper casing 30 is limited.

The present examples and embodiments are to be considered as illustrative and not restrictive, and the invention is not to be limited to the details given herein, but may be modified within the scope and equivalence of the appended claims.

What is claimed is:

1. A fuel cell ion exchanger arranged in a coolant circuit for a fuel cell, the fuel cell ion exchanger comprising:
    a lower casing including an upper opening, an intake port, and a discharge port, wherein the discharge port is located in an upper portion of a circumferential wall;
    an upper casing including a lid and a cylinder, wherein the lid is arranged on the opening, and the cylinder extends downward from the lid and is accommodated at an inner side of the circumferential wall; and
    a cartridge provided integrally with an inner side of the cylinder, wherein the cartridge accommodates an ion exchange resin, wherein
    the cylinder includes a communication hole, through which the inner side of the cylinder is in communication with the discharge port, and
    the upper casing includes an accumulation limiting structure that limits air remaining immediately below a lower surface of the lid after entering the cylinder together with coolant.

2. The fuel cell ion exchanger according to claim 1, wherein
    an upper end of a wall surface of the communication hole and the lower surface of the lid are located at the same height.

3. The fuel cell ion exchanger according to claim 1, wherein
    the lower surface of the lid, at a portion adjacent to the communication hole, is located at the same height as an upper end of a wall surface of the communication hole, and
    the lower surface of the lid becomes lower as the distance from the communication hole increases.

4. The fuel cell ion exchanger according to claim 1, further comprising:
    a tube that projects from an outer circumferential surface of the cylinder of the upper casing, wherein the tube includes the communication hole; and
    a recess formed in an inner surface of the circumferential wall of the lower casing, wherein the recess receives the tube.

5. A fuel cell system comprising:
    a fuel cell;
    a coolant circuit through which coolant flows to cool the fuel cell; and
    a fuel cell ion exchanger arranged in the coolant circuit for a fuel cell,
    the fuel cell ion exchanger comprising:
        a lower casing including an upper opening, an intake port, and a discharge port, wherein the discharge port is located in an upper portion of a circumferential wall;
        an upper casing including a lid and a cylinder, wherein the lid is arranged on the opening and the cylinder extends downward from the lid and is accommodated at an inner side of the circumferential wall; and
        a cartridge provided integrally with an inner side of the cylinder, wherein the cartridge accommodates an ion exchange resin, wherein
        the cylinder includes a communication hole, through which the inner side of the cylinder is in communication with the discharge port, and
        the upper casing includes an accumulation limiting structure that limits air remaining immediately below a lower surface of the lid after entering the cylinder together with coolant.

6. The fuel cell system according to claim 5, wherein
    an upper end of a wall surface of the communication hole and the lower surface of the lid are located at the same height.

7. The fuel cell system according to claim 5, wherein
    the lower surface of the lid, at a portion adjacent to the communication hole, is located at the same height as an upper end of a wall surface of the communication hole, and
    the lower surface of the lid becomes lower as the distance from the communication hole increases.

8. The fuel cell system according to claim 5, wherein
    the fuel cell ion exchanger further comprising:
    a tube that projects from an outer circumferential surface of the cylinder of the upper casing, wherein the tube includes the communication hole; and
    a recess formed in an inner surface of the circumferential wall of the lower casing, wherein the recess receives the tube.

* * * * *